3,637,849
SUBSTITUTED BENZYLIDENEAMINO GUANIDINES
William J. Houlihan and Robert E. Manning, Mountain Lakes, N.J., assignors to Sandoz-Wander, Inc., Hanover, N.J.
No Drawing. Filed Aug. 16, 1968, Ser. No. 765,739
The portion of the term of the patent subsequent to July 6, 1988, has been disclaimed
Int. Cl. C07c 133/10
U.S. Cl. 260—564 F        3 Claims

ABSTRACT OF THE DISCLOSURE

Substituted benzylideneamino - 3 - hydroxy-3-loweralkyl-guanidines, e.g., 1-(2,6-dichlorobenzylideneamino)-3-hydroxy-3-methyl guanidine, are useful as hypotensives.

---

This invention relates to benzylideneamino guanidines, acid addition salts thereof, and to methods for their preparation. The substituted benzylideneamino guanidines of this invention may be represented by the following structural formula:

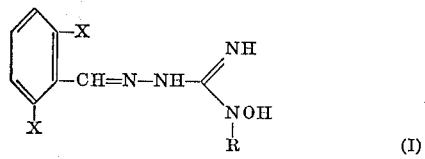

where:

each X, independently, represents halo having an atomic weight of about 19–36, and
R represents straight chain lower alkyl, i.e., alkyl having 1–5 C atoms such as methyl, ethyl and n-butyl.

The compound of Formula I which is 1 - (2,6-dichlorobenzylideneamino) - 3 - hydroxy-3-methyl-guanidine represents a preferred aspect of this invention.

The compounds of Formula I may be prepared by treating in solvent an aldehyde of the formula

where X is as defined above, with 1-amino 3-hydroxy-3-straight chain loweralkyl guanidine (III).

In accordance with the above process, the compounds of Formula I are prepared by treating the aldehydes of Formula II with 1-amino - 3 - hydroxy-3 straight chain lower alkylguanidine (III) or an acid addition salt thereof in inert solvent such as a lower-alkanol, e.g., methanol, ethanol or isopropanol. The reaction may be conducted at a temperature of from about 20–70° C., preferably 25–45° C. Neither the solvent nor the temperature of reaction is critical. The resulting product (I) is recovered by conventional techniques such as recrystallization and filtration.

When an acid addition salt of 1-amino-3-hydroxy-3-alkyl-guanidine is utilized, the resulting product (I) is obtained as the corresponding acid addition salt. Such salt may be converted to the free base by conventional techniques. When an acid addition salt of the compound of Formula I is desired, it may be obtained by salifying the free base.

Certain of the aldehydes of Formula II are known and may be prepared according to methods disclosed in the literature. Those other aldehydes (II) not specifically disclosed may be prepared by analogous methods from known materials.

One may obtain 1-amino-3-hydroxy-3-alkyl guanidine (III) by treating in solvent and in the presence of base an acid addition salt of S-loweralkyl or S-benzylisothiosemicarbazide (V), preferably S-methylisothiosemicarbazide, with an acid addition salt (e.g., hydrohalide) of N-alkyl-hydroxylamine. The acid addition salts of (V) useful according to this procedure include strong mineral acid addition salts such as the hydrohalide salts, e.g., the hydrochloride salt and the hydroiodide salt, the lower alkyl sulfate salts such as the methyl sulfate salt, and the like. Alkali and alkaline earth metal hydroxides, preferably sodium hydroxide or potassium hydroxide are useful as the base. About 1 molar equivalent of the base should be used to obtain good conversion to the 1-amino-3-hydroxy-3-alkyl-guanidine (III). The reaction is conducted at a temperature of about 20–60° C., preferably about 25–35° C. It is performed in aqueous solvent such as water, either alone or in admixture with lower alkanol such as ethanol, isopropanol, or the like. The guanidine (III) may be recovered using conventional techniques and converted to acid addition salts such as those mentioned above by salifying.

The compounds of Formula I may alternatively be prepared by treating a 2,6-dihalobenzaldehyde S-loweralkyl-isothiosemicarbazone (VI) with N-alkylhydroxylamine (VII) (the latter preferably as an acid addition salt, e.g., a hydrohalide such as the hydrochloride). The reaction may be represented as follows:

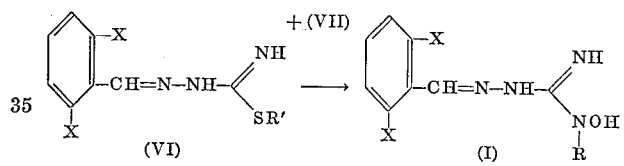

where X is as previously defined, R is straight chain loweralkyl, i.e., straight chain alkyl having 1–5 carbon atoms such as methyl, ethyl and n-propyl, and R' represents loweralkyl, i.e., alkyl having 1–4 carbon atoms such as methyl, ethyl and isopropyl.

The isothiosemicarbazone (VI) is treated with the N-alkylhydroxylamine in a solvent which dissolves both reactants, such as water in admixture with a loweralkanol, e.g., methanol or ethanol, or a tetrahydrofuran-water mixture, and the like. The reaction may be carried out at a temperature of about 10° C. to 50° C., preferably about 15°–30° C. The particular solvent and temperature used are not critical in obtaining the compounds (I). In a manner similar to that earlier described respecting the process for preparing the compounds (I), use of an acid addition salt of N-alkylhydroxylamine provides a corresponding salt of the benzylideneamino guanidine (I).

The S-loweralkylisothiosemicarbazones (VI) are prepared by treating a 2,6-dihalobenzaldehydethiosemicarbazone of the formula

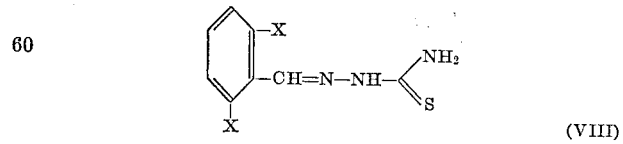

where X is as earlier defined, in solvent with a loweralkyl halide, such as methyl iodide, in solvent such as loweralkanols, preferably at a temperature of 50°–80° C. The intermediate (VI) is recovered by conventional techniques as the acid addition salt, e.g., the hydroiodide. Said salt is converted to the free base by treatment with, e.g., sodium carbonate in solvent, conveniently at about room temperature.

Some of the Compounds VIII are known and are prepared according to methods disclosed in the literature. Those of the compounds of Formula VIII not specifically disclosed may be prepared by treating an appropriate 2,6-dihalobenzaldehyde with thiosemicarbazide in solvent such as ethanol at reflux temperature.

Similarly, certain of the isothiosemicarbazides (V) are known compounds and may be prepared by methods disclosed in the literature. Those isothiosemicarbazides not specifically disclosed in the literature may be prepared by analogous methods from known materials.

The compounds represented by Formula I above are useful because they possess pharmaceutical properties in animals. In particular, these compounds are useful as hypotensives, as indicated by their activity in anesthetized cat given 0.3–3.0 mg./kg. i.v. of active material and tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the Compounds I may be similarly administered in the form of their non-toxic pharmaceutically acceptable acid addition salts, i.e., salts of a pharmaceutically acceptable acid. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluene-sulfonate, benzene-sulfonate and the like.

In general, satisfactory results are obtained when these compounds are administered at a daily dosage of about .03 milligram to about 50 milligrams per kilogram of animal body weight. This daily dosage is preferably administered 2 to 4 times a day, or in sustained release form. For most large mammals such as primates, the total daily dosage is from about 0.3 milligram to about 200 milligrams. Dosage forms suitable for internal use comprise from about .075 milligram to about 100 milligrams of the active compound in intimate admixture with a solid or liquid pharmaceutically acceptable carrier or diluent.

A representative formulation suitable for oral administration is a tablet prepared by standard tabletting techniques which contains the following.

| Ingredient: | Parts by wt. |
|---|---|
| 1 - (2,6-dichlorobenzylideneamino)-3-hydroxy-3-methylguanidine hydrochloride | 10 |
| Tragacanth | 2 |
| Lactose | 79.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

1-(2,6-dichlorobenzylideneamino)-3-hydroxy-3-methylguanidine hydrochloride

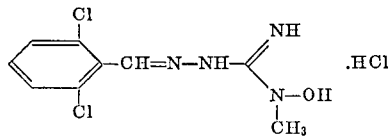

A mixture of 2,6-dichlorobenzaldehyde-3-methyl-3-isothiosemicarbazone (13 g.), N-methylhydroxylamine hydrochloride (4.5 g.) and ethanol (100 ml.) is stirred for 1 day. The resultant crystals (8.5 g.) are collected by filtration and recrystallized from ethanol-ether (1:1) to give 8.9 g. 1-(2,6-dichlorobenzylidene-amino)-3-hydroxy-3-methyl guanidine hydrochloride; M.P. 218–221° C.

EXAMPLE 2

1-(2,6-dichlorobenzylideneamino)-3-hydroxy-3-methylguanidine hydrochloride (alternate procedure)

2 N sodium hydroxide solution (5 ml.) is added to a stirred suspension of S-methylisothiosemicarbazide hydroiodide (2.33 g.) and N-methylhydroxylamine hydrochloride (0.9 g.) in water (6 ml.) and stirred for 48 hours. The solution is evaporated in vacuo to provide 1-amino-3-hydroxy - 3 - methylguanidine. One third of the residue is dissolved in 16 ml. of ethanol and 2,6-dichlorobenzaldehyde (0.6 g.) is added to this solution. The reaction mixture is then stirred for 48 hours. The solution is then evaporated in vacuo and the residue dissolved in ether (30 ml.) and in hydrochloric acid (30 ml.). The aqueous phase is rendered alkaline with 2 N sodium carbonate solution and extracted with ether. The ether layer is dried with sodium sulfate and evaporated. The residue is dissolved in ether and excess dry hydrogen chloride is passed into the solution. The resultant mixture is evaporated in vacuo and the residue triturated with methylene chloride to afford a crude product. Recrystallization from ethanol-ether (1:3) provides 1-(2,6-dichlorobenzylideneamino) - 3 - hydroxy - 3 - methylguanidine hydrochloride; M.P. 218°–221° C. When the above process is carried out and S-benzylisothiosemicarbazide hydroiodide is used in place of S-methylisothiosemicarbazide hydroiodide, the identical product is again obtained.

What is claimed is:

1. A compound of the formula

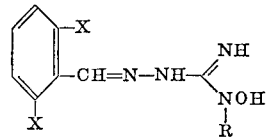

where
each X, independently, represents halo having an atomic weight of about 19–36, and
R represents straight chain lower alkyl, or an acid addition salt thereof of a pharmaceutically acceptable acid.

2. The compound according to claim 1 where each X is chloro and R is methyl.

3. A compound of claim 1 which is an acid addition salt of a pharmaceutically acceptable acid.

References Cited

UNITED STATES PATENTS

| 3,130,232 | 4/1964 | Paquelle | 260—564 |
| 3,349,099 | 10/1967 | Marxer | 260—326.14 |

FOREIGN PATENTS

| 958,832 | 2/1957 | Germany | 260—564 |

OTHER REFERENCES

Yale, J. of Medicinal & Pharmaceutical Chemistry, vol. 1, No. 2, pp. 121–133 (1959).

LEON ZITVER, Primary Examiner
G. A. SCHWARTZ, Assistant Examiner

U.S. Cl. X.R.

260—501.14, 552, 564 E; 424—326